D. E. WERTS.
LOCKING DEVICE.
APPLICATION FILED JUNE 2, 1920.

1,374,048.

Patented Apr. 5, 1921.

WITNESSES
Bernard Albly
P. D. Rollvaria

INVENTOR
DAVID E. WERTS
BY Munn & Co
ATTORNEYS

UNITED STATES PATENT OFFICE.

DAVID E. WERTS, OF OLYMPIA, WASHINGTON.

LOCKING DEVICE.

1,374,048.     Specification of Letters Patent.     Patented Apr. 5, 1921.

Application filed June 2, 1920. Serial No. 386,017.

*To all whom it may concern:*

Be it known that I, DAVID ELMER WERTS, a citizen of the United States, and a resident of Olympia, in the county of Thurston and State of Washington, have invented a new and Improved Locking Device, of which the following is a full, clear, and exact description.

This invention relates to locking mechanisms and has particular reference to locking mechanisms for automobiles.

An object of the invention is to provide a simple, rugged, effective, and easily attachable device, capable of attachment to certain parts of an automobile, particularly to the segment on the steering wheel of an automobile with which the gas and spark levers are connected.

Another object of the invention is to provide in such a device a casing which is capable of ready assembly as a simple unit and one which, when once locked on the machine, cannot be taken apart or tampered with except by the person having the proper key.

A further object is to provide a locking device which can be readily applied and locked to the machine by a few, simple, manual operations, and which can only be unlocked by the insertion of a certain key.

The invention in general comprises a casing from which a movable gripper mechanism or bar projects, and between which and the casing the part of the automobile to be locked is gripped. Manually-operable means extending from the casing may be operated to move this gripper toward the casing to grip the desired part of the automobile. As this is done, however, suitable devices within the casing automatically lock the moving parts against reverse movement so that the gripper cannot be released. Key-operated mechanism projecting within the casing may be actuated by the insertion of the proper key into the lock to release the lock from the moving parts, so that the exteriorly located manually-operable means may be actuated to move the gripper bar away from the casing and thus release the automobile part.

The invention is illustrated in the drawings, of which—

Figure 1:
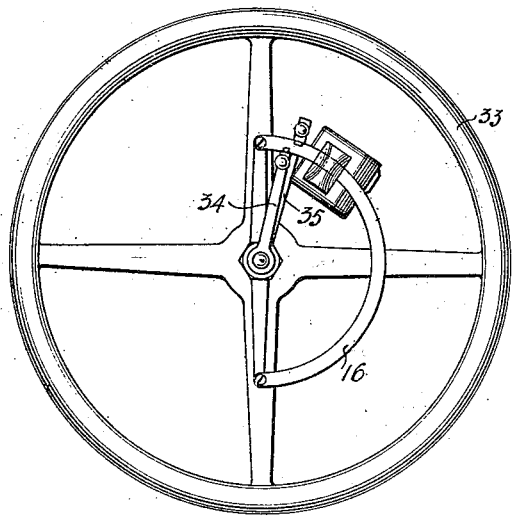
Figure 1 represents an automobile steering wheel, showing the gas and spark levers and the locking device connected to the segment to which they are related.
Figure 2:
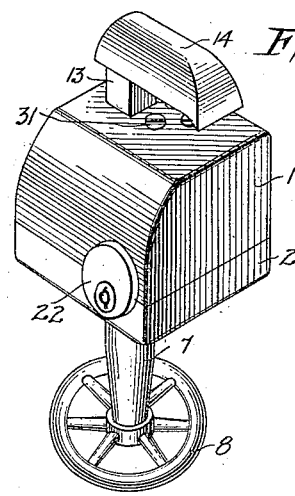
Fig. 2 is a perspective view of the assembled locking device.
Figure 4:
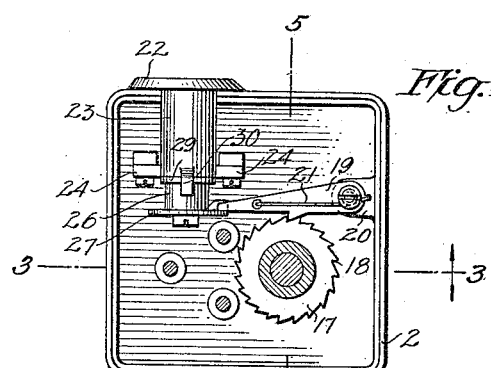
Fig. 4 is a horizontal section taken on the line 4—4 of Fig. 3.

As illustrated in the drawing, the invention comprises a casing made in two articulated portions 1 and 2. The portion 1 is provided with a lug 3 which is provided in turn with a cylindrical bore 4 and an upper square aperture 5. Substantially in line with this lug 3, the lower portion 2 is provided with an apertured flange portion 6. A shaft 7 is dimensioned to fit within the aperture in the flange portion 6 and is provided with a hand wheel 8. The upper end of the shaft 7 is outwardly flanged, and these outwardly extending portions 9 are adapted to bear upon the upper face of the flange portion 6. The outer end of the shaft 7 is also provided with two bores, one 10 of which is adapted to receive the lower end of the lug 3, and the other 11 and smaller of which is threaded and adapted to receive the similarly threaded lower end of a bar 12 seated within the bore 4 in lug 3. The upper end of this bar 12 is provided with a square portion 13 which moves within the square bore 5 of the lug 3, and this square portion 13 at its upper end is provided with a gripping head 14 which extends in a direction parallel to the upper surface of the upper casing from which the bar 13 extends. The lower outer edge of the gripping head 14 is beveled outwardly and downwardly toward the casing, as shown at 15. At 16 is designated a part of an automobile, such as the gas and spark lever segment, which is adapted to be gripped by my device between the casing 1 and the gripping head or bar 14.

The upper end of the shaft 7 is provided with a ratchet portion 17 having teeth 18 which are adapted to engage with a pawl 19. This pawl is pivoted on a projection 20 from the lower portion 2 of the casing and is normally held against the ratchet teeth 18 by means of a spring 21.

Figure 3:
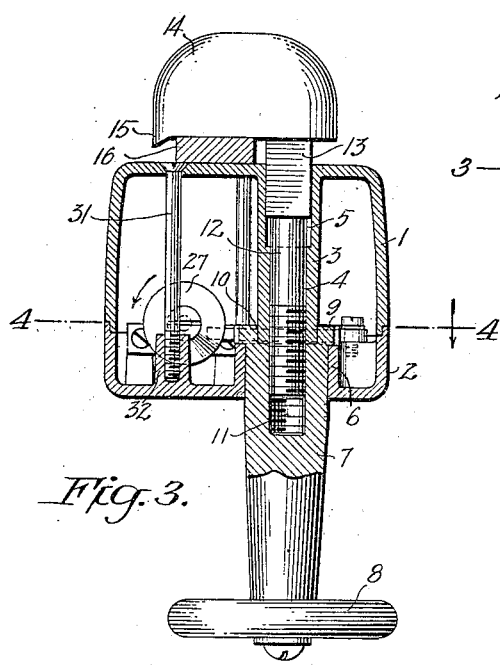
Fig. 3 is a vertical longitudinal section taken on the line 3—3 of Fig. 4.
Figure 5:
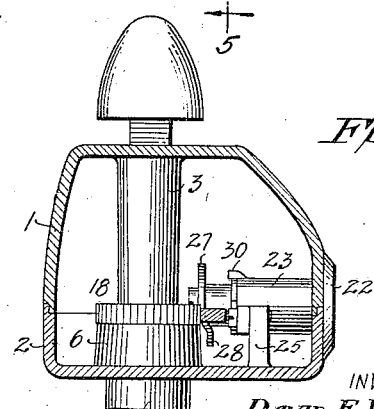
Fig. 5 is a vertical section taken on the line 5—5 of Fig. 4.
Figure 6:
Fig. 6 is a detail view of part of the key-operated locking mechanism.

A lock of any suitable configuration, as shown at 22, is inserted in a side face of the casing 2. The lock casing 23 has projecting ears 24 which, by any suitable means, such as screws, are adapted to be fastened to lugs 25 connected to the floor of portion 2 of the casing. The lock cylinder 26 of the lock 22 has on its outer face a cam 27 which is fastened thereto by any suitable means, such as a screw. This cam 27 is provided with a cam surface 28, the configuration of which causes the retraction of the pawl 19 from the ratchet teeth 18 when the key of the lock 22 is inserted in the lock cylinder 26 and moves the cam in a counterclockwise direction, as denoted by the arrow in Fig. 3. Attached to the lock cylinder 26 and adjacent the end of the lock casing 23 is a circular plate 29 a certain segment of the periphery of which is depressed (see Fig. 6). A projection 30 extending from the end of the lock casing 23 is adapted to extend over this depressed portion. When the lock cylinder 26 is moved in one direction or another, the projection 30 is adapted to contact with shoulders formed in the plate 29 by the depression, and in this manner the rotary movement of the key bolt in one direction or another is limited.

The articulated portions 1 and 2 of the casing are held together with the containing parts by means of a plurality of screws, such as 31, which enter apertures in the upper portion 1 and are threaded into bores in lug portions 32 positioned in the bottom of the portion 2. It will be noticed that the screw holes in the upper surface of the casing portion 1 are closely located beneath the under face of the gripper head 14, so that when a portion of an automobile, such as segment 16, is gripped between the casing and the gripper head, these screws, the only means whereby the parts of the casing can be separated, are completely covered. By this arrangement it is impossible to dismantle this device by tampering with it while it is in position locking some part of an automobile.

In Fig. 1 a steering wheel 33 is shown on which the levers 34 and 35 may represent the usual gas and spark levers which are guided in their movement by the metal segment 16. My locking device is shown as attached close to the spark and gas levers when they are in their extreme position at one end of the segment 16 so as to confine them to this position in which operation of the car by their movement is rendered impossible.

In the manipulation of my device, assuming that the gripping head 14 is sufficiently far above the face of casing 1 to enable the segment 16 to be gripped, or any other part to which it is desired to fasten this device, the locking device is placed with the part to be gripped between the casing and the head. The hand wheel 8 is then moved to the right, and by so moving draws the bar 12 with the gripping head 14 into the casing, thereby gripping the portion 16. As the hand wheel 8 is thus manipulated, the ratchet teeth 18 have been sliding over the pawl 19 which resiliently engages with each tooth as it passes, so that it is impossible to turn the hand wheel to the left since the pawl 19 would prevent such movement. The end of the pawl 19, however, lies adjacent the cam 27 and when a key is inserted in the lock 22 and is moved so as to turn the cam 27 in the direction above mentioned, the surface of the cam withdraws the pawl 19 from the ratchet teeth 18 and permits the hand wheel 8 to be turned in the reverse direction so as to release the gripper head 14 from the portion 16.

I claim:

1. A locking mechanism comprising a casing, a gripping mechanism extending from said casing, means for moving said gripping mechanism to and from said casing, means for normally limiting to one direction the movement of the above-mentioned means, and key-operated mechanism for releasing at will said second means.

2. A locking mechanism comprising a casing, a gripper bar extending from said casing and having a portion extending parallel to said casing, means for moving said gripping mechanism to and from said casing, means for normally limiting to one direction the movement of the above-mentioned means, and key-operated mechanism for releasing at will said second means.

3. A locking mechanism comprising a casing, a gripping mechanism extending from said casing, manually-operable means engaging said gripping mechanism within the casing and adapted to move it to and from said casing, means for normally limiting to one direction the movement of the above-mentioned means, and key-operated mechanism for releasing at will said second means.

4. A locking mechanism comprising a casing, a gripping mechanism extending from said casing, means for moving said gripping mechanism to and from said casing, pawl and ratchet mechanism within the casing for normally limiting to one direction the movement of the above-mentioned means, and key-operated mechanism for releasing at will said pawl and ratchet mechanism.

5. A locking mechanism comprising a casing, a gripper bar extending from said casing and having a portion extending parallel to said casing, manually-operable means engaging said gripping mechanism within the casing and adapted to move it to and from said casing, means for normally limiting to one direction the movement of the above-mentioned means, and key-operated mechanism for releasing at will said second means.

6. A locking mechanism comprising a casing, a gripper bar extending from said casing and having a portion extending parallel to said casing, means for moving said gripper bar to and from said casing, pawl and ratchet mechanism within the casing for normally limiting to one direction the movement of the above-mentioned means, and key-operated mechanism for releasing at will said pawl and ratchet mechanism.

7. A locking mechanism comprising a casing, a gripping mechanism extending from said casing, manually-operable means engaging said gripping mechanism within the casing and adapted to move it to and from said casing, pawl and ratchet mechanism within the casing for normally limiting to one direction the movement of the above-mentioned means, and key-operated mechanism for releasing at will said pawl and ratchet mechanism.

8. A locking mechanism comprising a casing, a gripper bar extending from said casing and having a portion extending parallel to said casing, manually-operable means engaging said gripper bar within the casing and adapted to move it to and from said casing, pawl and ratchet mechanism within the casing for normally limiting the movement of the manually-operable means to that direction which moves the gripper bar toward the casing, and key-operated mechanism for releasing at will said pawl and ratchet mechanism.

9. A locking mechanism comprising a casing, a gripper bar extending from said casing and having a horizontal portion parallel to said casing, a threaded shaft on said gripper bar extending into said casing, a manually-operable shaft having a threaded bore to receive the end of the gripper shaft, a ratchet carried by said manually-operable shaft, a pawl engaging said ratchet, cam means for engaging said pawl and releasing it from the ratchet, and key-operated mechanism connected to said cam.

10. A locking device comprising a two-part articulated casing, a gripper head extending from one face of said casing and having a portion parallel thereto, screw means for connecting the parts of the articulated casing, the heads of said screws being located immediately below the underface of said gripper head to hide them from view when an object is being gripped between the head and the surface of the casing.

11. A locking device comprising a two-part articulated casing, a gripping head extending from the casing, means for joining the two portions of the casing together, said joining means lying adjacent the gripper head and adapted to be covered when an object is being gripped by said head.

DAVID E. WERTS.